J. CHURCH.
Screw-Clamp and Lifting-Jack.

No. 222,573.        Patented Dec. 16, 1879.

ATTEST:        INVENTOR:

Robert Burns        James Church

Saml. M. Little

UNITED STATES PATENT OFFICE.

JAMES CHURCH, OF ST. LOUIS, MISSOURI.

IMPROVEMENT IN SCREW-CLAMPS AND LIFTING-JACKS.

Specification forming part of Letters Patent No. 222,573, dated December 16, 1879; application filed April 28, 1879.

*To all whom it may concern:*

Be it known that I, JAMES CHURCH, of the city of St. Louis, in the State of Missouri, have invented certain new and useful Improvements in Screw-Clamps, Lifting-Jacks, &c.; and I do hereby declare that the following is a full, clear, and exact description of the same, reference being had to the accompanying drawings, and to the letters of reference marked thereon.

This invention consists, first, in the provision, in a suitable head or housing, of a traveling screw arranged parallel with the moving bar and gearing with the same so as to cause the said bar to move on it while it (the said screw) is moving in the housing, the purpose being to effect a quick movement with a fine thread in the screws or worms; secondly, in the construction of the moving bar with a section of screw cut in its side, the purpose being to enable the use of a large operating screw, and at the same time allow the head or housing to be made small and compact.

Figure 1:
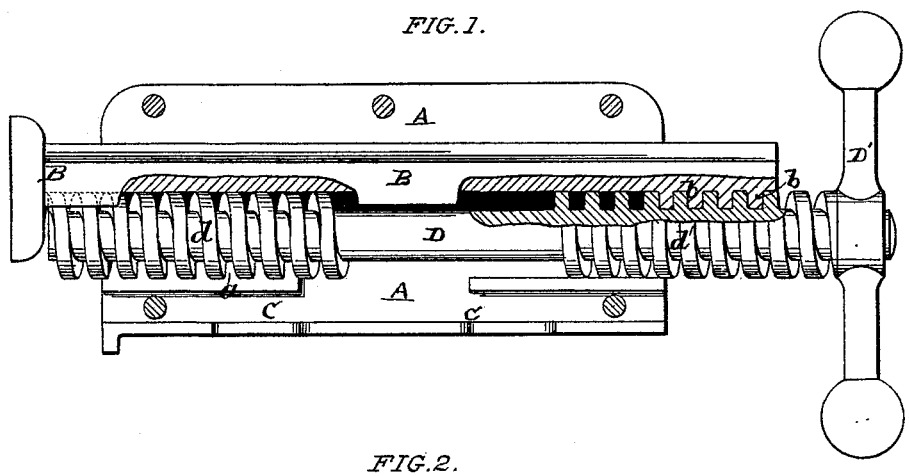
Figure 2:
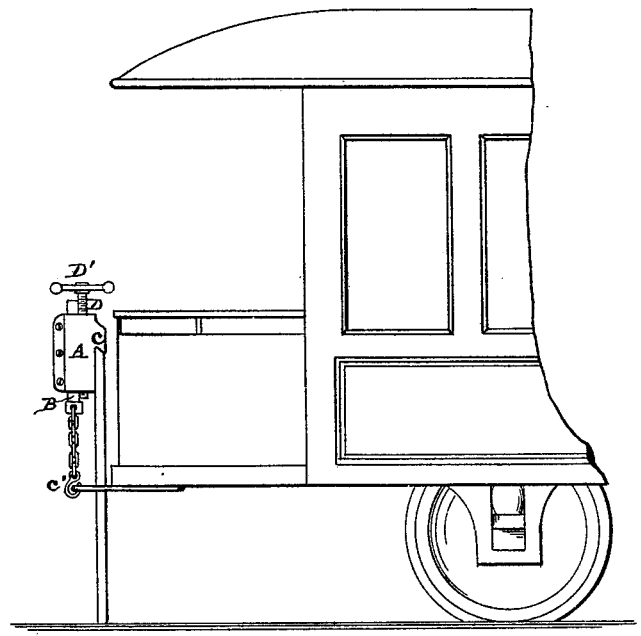

In the drawings, Figure 1 is a sectional view, showing my invention as applied to screw-clamps. Fig. 2 is a view illustrating my invention as applied to lifting-jacks for street-cars.

In the drawings, A represents the head or housing, in which is arranged to slide the moving or clamping bar B, and said head is provided with a T-stop, C, for securing it in position onto the table, bench, or other fixture, by means of headed bolts, when the device is used as a clamp. When used as a car-jack it will be provided with a hook-lug, $c$, which engages a rod resting on the ground, and its moving bar will be provided with a hook, $c'$, and a small section of chain for engagement with the draw-bar of the car, as shown.

D is the screw-shaft provided with two screws or worms, $d$ $d'$. One of these worms, $d$, turns in a female worm, $a$, in the clamp-head, while the other worm, $d'$, turns in a female screw, $b$, of the moving bar B.

The worms $d$ $d'$ may have the same pitch, or the pitch may be varied when the pitch is the same. Each turn of the screw-shaft will advance the moving bar the distance between two of the threads of the worm or screw, owing to the fact that both the screw-shaft and the traveling bar move when the device is opated.

The screw-shaft D is provided with a suitable handle, D', by which to operate it.

The advantages of my improved construction are, that a finer thread can be used in the screws, at the same time have as quick a movement as the ordinary screw-clamp, without the liability to jarring loose, as is the case with the ordinary screw-clamp; also, by the use of a section of screw $b$ in the moving bar, the housing or head can be made small and compact.

I claim as my invention—

The head or housing cast with a section of thread, $a$, and the moving bar B, cast with a section of thread, $b$, in combination with the screw-shaft D, formed with screws $d$ $d'$, as and for the purpose set forth.

JAMES CHURCH.

Witnesses:
ROBERT BURNS,
SAML. H. LITTLE.